3,457,339
PROCESS FOR MAKING END CAPPED FILTER ELEMENTS

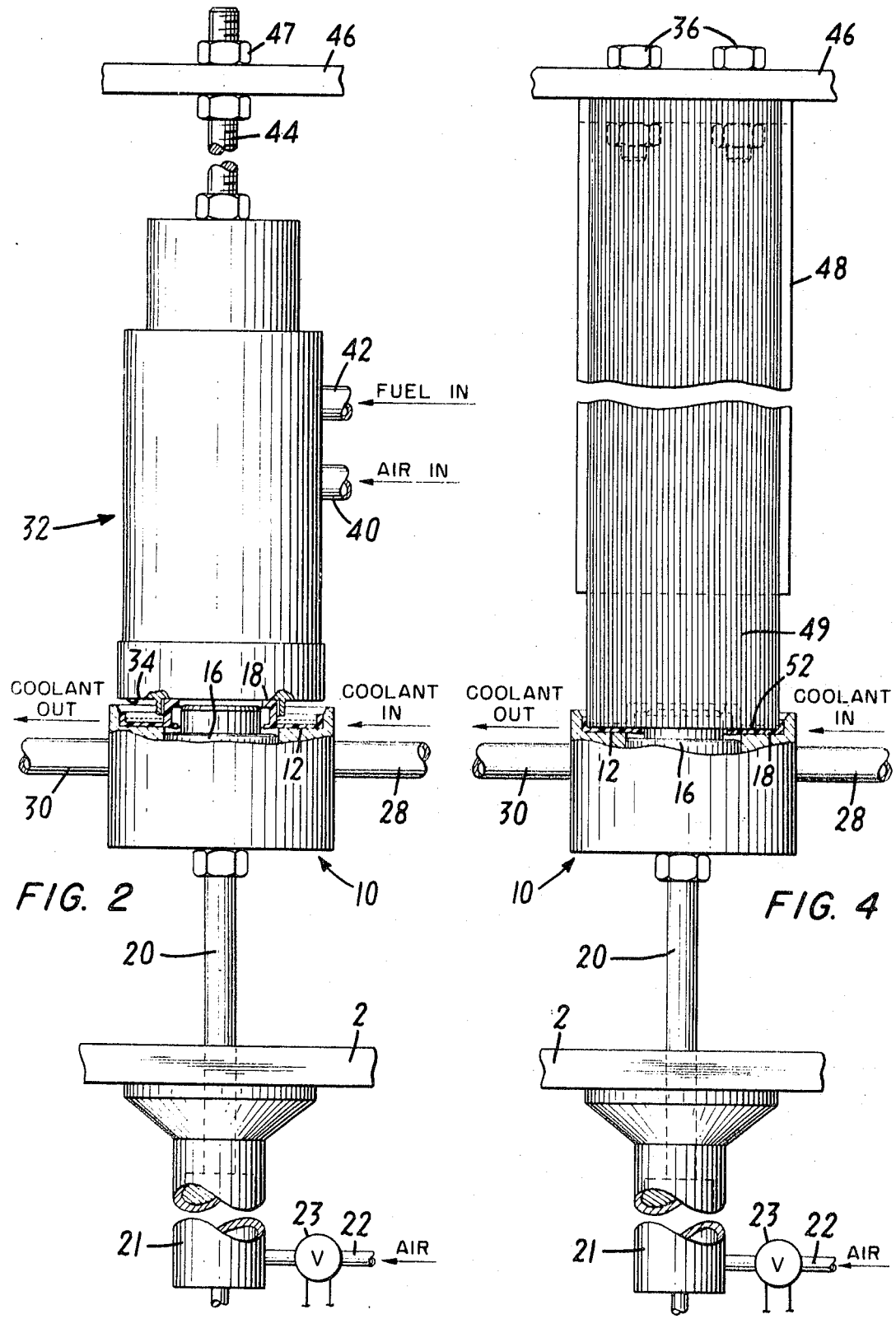

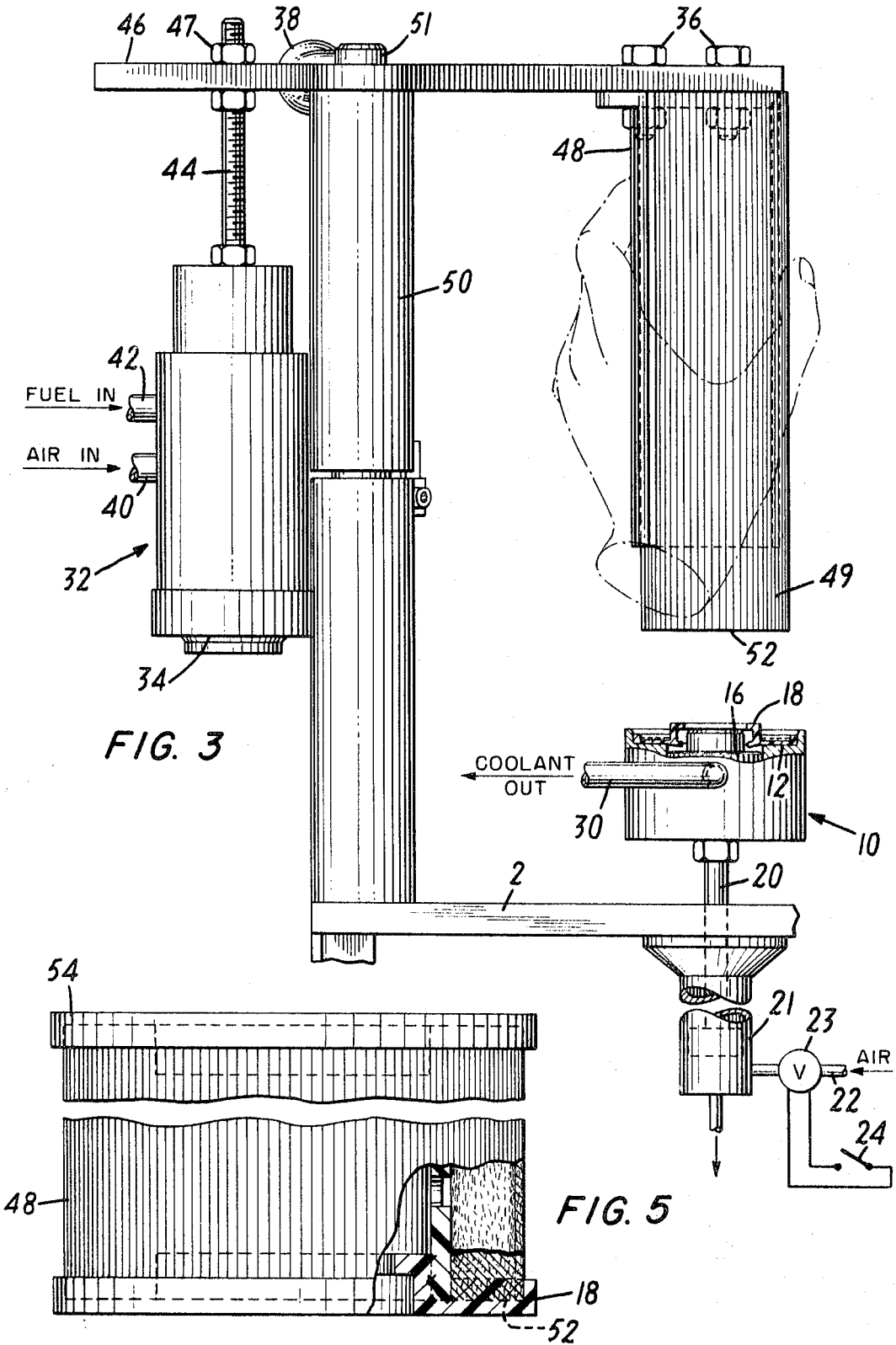

David B. Pall, Roslyn Estates, and Tadas K. Jasaitis, Great Neck, N.Y., assignors to Pall Corporation, Glen Cove, N.Y., a corporation of New York
Filed Dec. 8, 1965, Ser. No. 512,286
Int. Cl. B29c 27/30
U.S. Cl. 264—162        9 Claims

ABSTRACT OF THE DISCLOSURE

A process for applying end caps to a filter sheet material formed in a tubular shape is provided. In the instant process an inside face of a thermoplastic end cap is fused into a liquid of a viscosity capable of penetrating through the pores of a filter sheet from one surface to the other. While the inside face of the end cap is liquefied, the outside face of the end cap is cooled to a temperature below the softening point of the thermoplastic material to maintain the remainder of the cap solid. The end of the filter sheet is embedded into the liquefied face of the end cap so that the liquefied thermoplastic material penetrates through the pores of the filter from one surface of the filter sheet to the other. Upon hardening of the plastic material of the end cap, a continuous leakproof matrix of the end cap material in the pores of the filter material is formed at the interface between the end of the filter sheet and the end cap thereby bonding the filter sheet to the end cap in a leakproof seal.

---

This invention relates to end capped filter elements and to a process and apparatus for making the same, and more particularly to end capped tubular or cylindrical filter elements in corrugated form and to a process for end capping such filter elements and to apparatus particularly designed for this purpose.

Tubular filter elements as conventionally used are arranged to accept fluid flow from the outside surface of the filter through the filter to the inside, whence the filtrate flow is drawn off. In the manufacture of tubular filter elements from one or more sheets of filter material, it is customary to fold the sheet or sheets into the form of a tube or cylinder, and lap the opposite ends of the material in a side seam, which is bonded with an adhesive coating between the faces. The open ends of the tube are then closed by application of end caps, which are bonded to the tube ends with a suitable adhesive. The caps usually are provided with flanges which embrace the ends of the tube or cylinder, retaining the tube within the flanges, and ensuring a secure leaktight seal. The end caps are provided with apertures, as required for fitting the filter element in the filter assembly, and they may also have portions adapted to receive and seal against a gasket or other sealing means to ensure a tight fit with the pipe connections in the fluid system.

End caps have been attached to tubular filter elements by applying an adhesive either to the ends of the tube or to the end caps, fitting the end caps to the tube, and maintaining pressure upon the composite until a firm bond has been effected. It is absolutely essential that the seal between the end cap and the filter be leakproof, since otherwise unfiltered fluid can bypass the filter at this point, contaminating the filterate. The end caps also provide structural rigidity to the tube, and in the case of a corrugated tube may also support the folds thereof, retaining them in position. Thus, it is ordinarily essential that a tight seal of high strength be obtained between the end cap and the tube ends. However, this is not possible to achieve with use of an adhesive, which has been found to be far from fool-proof, and many filter elements must be rejected because of faulty seals in the capping.

An alternative procedure forms end caps in situ by casting them on tubular filter elements. A thermoplastic or thermosetting resin such as a plastisol is poured into a mold of the desired end cap design, the ends of the tubular filter dipped into the resin, and thereafter the resin is cured in situ to a hardened end cap. Such a process for end capping is disclosed in U.S. Patent No. 2,732,031, dated Jan. 24, 1956 to Rabbitt et al.; U.S. Patents Nos. 2,771,156 and 2,934,791 to Kasten et al., dated Nov. 20, 1956 and May 3, 1960, respectively; and U.S. Patent No. 2,941,620 to Thornburgh, dated June 21, 1960. However, end caps prepared by casting normally do not conform to the necessary close tolerances and sharp definition of contour details that are readily obtained in end caps formed by injection molding. Furthermore, liquid thermoplastic and thermosetting resins are unsuitable where the end caps are to be formed on tubular filters containing ultrafine filter material, i.e. filter material having an average pore size of less than about 5 microns. The viscosity of the liquid resins commercially used for this purpose is high, e.g., above about 50 cp. so that they cannot completely penetrate the pores of the ultrafine filter material medium to form a tight seal with the filter materials. On the other hand, where liquid thermosetting resins having a viscosity of less than about 50 cp. have been employed in making end caps, it has been found that such liquid resins can penetrate the pores of the filter sheet material but an excess amount of wicking results, since these resins of necessity takes several minutes to set, i.e. the liquid resin does not set rapidly enough to prevent its flow up a good part of the length of the tubular filter element which results in reduction of the filtering capacity of the filter material and poor bonding as the resin is drawn away from the cap.

U. S. Patent No. 3,013,607, dated Jan. 19, 1961 to Jackson et al., relates to a method of end capping tubular filter elements wherein thermoplastic end caps or cap disks are subjected to the heat induced in the field of an electric inductance coil in contact with the cap, to a point where the cap is so softened that the edges of the filter element can be embedded in the cap to the depth required to permanently bind the parts together. A metallic strip is applied to the edges of the filter element and external support jacket, or the edges of the filter element and external support jacket are coated with an electrically conductive or semi-conductive material, so as to reinforce the filter edges, and enhance the heat conductivity through the edges and end cap.

In order to avoid losing the shape of the end cap, Jackson et al., can only soften the portion of the end cap where the filter material is embedded into the cap. However, this procedure does not produce a truly strong leakproof seal, because the temperature reached by the metallic edges is limited to below from about 350 to about 400° F. depending on the type of filter material employed, and by localized heating of the end cap at such low temperatures, the softened thermoplastic resin of the end cap is too viscous to wet and to penetrate the pores of the external surfaces of the filter material to the interior surfaces and pores of the filter material. Accordingly, the bonding of the edges of the filter material to the end cap is limited only to the exterior surface of the filter material and thus, a crack between the end cap and exterior surface of the filter element can remain, and will result in a faulty seal.

If the electrically conductive coating or metallic strips of Jackson et al. are not properly applied, the filter edges and external support jacket and the thermoplastic material will not be properly heated, and thus the seal subsequently formed between the filter element and end cap can also be faulty. In addition, the Jackson et al. filter element is designed so that the edges of the filter element and the core or internal support frame are not flush, and thus the core does not join with the filter edges in making a flush fit against the end cap to ensure a leakproof seal. Accordingly, where a corrugated filter material is used and the edges of the filter material rise above the internal support as shown in Jackson et al., it is quite possible that non-uniform bonding of the softened resin could occur between the length of the corrugations above the internal support which could result in a faulty seal between the end cap and filter element.

Furthermore, the use of a metallic strip on the edges of the Jackson et al. filter elements greatly limits the application to which the end capped filter element can be put. For example, under certain conditions, the metallic strip can corrode and/or contaminate the filter material or the medium being filtered.

Furthermore, the use of such a metallic strip on the edges of the filter elements increases the cost of making the filter elements, and greatly complicates the procedure used in corrugating such filter elements.

In accordance with the instant invention, a process and apparatus are provided for end capping tubular, such as cylindrical, filter elements while ensuring a leakproof seal between the end cap and filter element, without any of the drawbacks of the prior art.

The process of the invention for applying end caps to filter sheet material formed in a substantially tubular shape, comprises liquefying an inside face of a thermoplastic end cap to from about 10 to about 90% of the thickness of the end cap to be adhered to the filter tube while cooling the outside face of the thermoplastic end cap to a temperature below its softening point to maintain the remainder of the end cap in a solid state, embedding all of the edges of one end of a filter material in the liquefied face of the end cap in a leakproof seal therewith, allowing the liquefied thermoplastic material to permeate the pores of the filter material, and hardening the liquid plastic, thereby bonding the end cap to the filter. The procedure can be repeated for capping the other end of the filter element.

The process of the instant invention can be advantageously and is preferably modified to further ensure the formation of a leakproof seal between the filter element and end cap, by first grinding the edges at the ends of the end cap and any external support jacket and/or internal support core, until all edges are substantially of the same length, so that a flush fit of the edges, of the filter material, jacket and/or core can be effected against the end cap.

The apparatus in accordance with the invention comprises an end cap holder, means to liquefy an exposed face portion of an end cap in the holder, and means to cool a remaining unexposed face portion of the end cap to sufficiently below its liquefaction temperature to maintain it in a solid condition while the exposed face is liquid.

In a preferred embodiment of the apparatus, the end cap holder is equipped with the means to cool the end cap.

In carrying out the process of the invention, using the above described apparatus, a thermoplastic filter end cap is inserted into the end cap holder which is designed so that a close fit is maintained between the end cap and holder. The end cap holder is cooled, for example by water cooling, so that the unexposed face of the end cap in contact with the holder is cooled and thereby at all times is maintained at a temperature below its melting point and in a solid state.

The end cap is heated, for example, by a direct flame generated by a burner, preferably shaped to the contour of the end cap, to a temperature above the maximum softening point of the thermoplastic material, thereby liquefying the exposed top face of the end cap to form about 10 to about 90% and preferably from about 40 to about 60% of its thickness. The flame is then removed from the end cap, and one end of a filter element, whose edges are substantially even with any external and/or internal support, is then placed into the molten end cap to the desired depth, which could be up to 90% of the thickness of the end cap and preferably is no more than about 60% of the thickness of the cap. The relatively cold filter element causes the end cap to rapidly harden in a few seconds and wicking is thereby prevented. The filter element and end cap is allowed to remain in and end cap holder until the end cap has completely solidified, at which time a unitary structure comprised of the filter element and end cap is formed which can then be removed from the holder.

The means to liquefy a portion of the thickness of the end cap includes any conventional heat source which can raise the temperature of the thermoplastic material above its maximum softening point, such as a burner to produce an air or oxygen flame, hot air at a temperature well above the liquefaction point of the thermoplastic material, radiant heat, and the like. The heat source need be directed against the end cap only for that amount of time necessary to heat one face of the end cap to a temperature above its maximum softening temperature, thereby to liquefy the end cap to the desired depth. Thus, for example, where a polypropylene end cap is employed, a flame, depending upon its temperature, need be directed against the face of the end cap from about 20 to about 60 seconds.

The process and apparatus of the invention are applicable to end capping tubular filter elements of any configuration. An end cap appropriate to the configuration of the tubular filter element is of course employed in each case. Normally, filter elements in cylindrical corrugated form are employed, but it will be apparent that the process is applicable to tubular elements in any cross-sectional configuration, including plain, folded, convoluted and corrugated triangular, square, rectangular, elliptical, and indeed any polygonal filter tubes. The size and configuration of the convolutions in the case of a corrugated element are absolutely immaterial, and so also is the thermoplastic material of which the filter element and end caps are made.

The process and apparatus are applicable to filter elements made of any filter material. If the material has insufficient rigidity to be self-supporting, the tube can be made so by incorporation of a central core or support, such as a spring or tube of rigid metallic or plastic material, for instance, a perforated metal core or spring of conventional construction. As indicated hereinbefore, it will usually be desirable in such a case to have the internal support of a length substantially equal to that of the filter element so that the internal support and the edges of the filter element are in a substantially flush fit with the end cap when they are bonded thereto. The end caps can be furnished with appropriate raised or depressed portions to meet the shape requirements of the ends of the filter support and the folds or convolutions of the filter tube, and in accordance with the requirements of the filter assembly in which the filter element is to be used.

Thus, the process and apparatus of the invention are applicable to filter elements made of any porous sheet material having pores extending from surface to surface. One or several layers of the same or varying porosity can be employed, in close juxtaposition, or even bonded together, or also spaced apart. Paper, which can, if desired, be resin impregnated, is a preferred base material, since it yields an effective, versatile and inexpensive fluid-permeable filter medium. The invention is, however, applicable to papers and like sheet materials formed of any type of fiber, including not only cellulose fibers, but also synthetic resin fibers, and fibers of other cellulose derivatives, including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides and protein fibers of various sorts, such as zein and the alginates, glass, asbestos, potassium titanate, mineral wool, polystyrene, rubber, casein, hemp, jute, linen, cotton, silk, wool, and mohair. Also useful, in addition to papers, are textile fabrics, and woven and nonwoven fibrous layers of all kinds, such as felts, mats and bats made of fibrous materials of any of the types listed above.

The filter sheet material of which the filter elements of the invention are made if desired, can be impregnated with a synthetic resin or cellulose derivative to increase its strength and resistance to wear by the fluid being filtered. The impregnating agent can be any material useful in the impregnation of papers and textile materials. Such materials are well-known in the paper and textile arts. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamineformaldehyde resins, polyester resins, and polyepoxide resins.

The process of the invention is particularly applicable to microporous filter elements. Microporous filter elements may be defined as having an average pore size of less than about 5 microns and preferably an average pore size of less than about 0.5 micron. There is no effective lower limit on the pore size of the microporous filter, except that imposed by the excessive pressure required to force water to pass through the filter, an unduly low rate of flow-through, and more rapid plugging. It has been found, in practical applications, that microporous filters having an average pore size as low as 0.02 micron and even lower can be end capped in the invention.

The depth or thickness of the microporous fibrous filter is not critical. A thick filter operates efficiently, but it should not create an undue pressure drop.

A preferred microporous filter is made of a porous base, such as paper, having relatively large pores, within or on the surface of which is deposited particulate material in an amount to diminish the average diameter thereof to less than 1 micron while retaining a voids volume in the microporous portion in excess of 75%, as disclosed in copending U.S. application Ser. No. 98,595 filed Mar. 27, 1961, now U.S. Patent No. 3,238,056 to Pall et al. dated Mar. 1, 1966, U.S. Ser. No. 215,151 filed Aug. 6, 1962, now Patent No. 3,246,767 to Pall et al. dated Apr. 19, 1966 the disclosures of which are herein incorporated by reference. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired. A particularly preferred microporous filter is one of the type described in Patent No. 3,246,767 which comprises a porous base having superimposed thereon and adherent thereto a microporous layer comprising a fibrous material of which a proportion of fibers extend outwardly from the porous base at an angle greater than 30°, the microporous layer having an average pore diameter of less than 1 micron and a voids volume of at least 75%. The fiber spacing and angular disposition to the base throughout the entire microporous layer is noted by cross-sectional examination, upon sufficient magnification through an optical or electron microscope. The angular disposition of the fibers is in a large measure responsible for the high voids volume and low pore size characteristic of these microporous filters.

The end caps can be of any desired configuration, appropriate to the requirements of the filter tube and filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

As is well known is the field of plastics, most thermoplastic materials have a wide range of temperatures over which they can be softened. However, it is only after the thermoplastic material is heated to a temperature above its maximum softening point that the material is liquefied. Accordingly, the end caps that are suitable for use herein can be made from any thermoplastic resin that is in, or can be brought to, a liquid state, as by heating to above its maximum softening point. If an ultrafine filter material, i.e. filter material having an average pore size less than about 5 microns, is employed, the thermoplastic material employed in the end cap preferably when liquid has a low viscosity, and preferably less than about 50 c.p., to ensure that the resin can penetrate the pores of the filter material, and thus form a leakproof seal.

The end cap resin materials can be employed alone, with conventional fillers and/or pigments and/or in solution in a suitable solvent. Typical resins which can be employed herein, their softening range, and their liquefaction temperature, are set out in the table below. It is to be understood that the liquefaction temperature of the resins listed hereinafter varies with the molecular weight of the resins, and that the softening range listed for each resin is for the most common form of the particular resin.

TABLE

| Name | Softening point | Liquefaction point |
| --- | --- | --- |
| Polyethylene | About 221° F | Above 110 to 115°C |
| Polypropylene | 285–320° F | Above 320° F. |
| Polyisobutylene | | Above 355° F. |
| Polystryene | 190–230° F | Above 230° F. |
| Polyamides (nylon) | 450–485° F | Above 485° F. |
| Cellulose acetate | 115–230° F | Above 230° F. |
| Ethyl cellulose | 210–270° F | Above 270 °F. |
| Cellulose acetate butyrate | 140–250° F | Above 250° F. |
| Copolymers of vinyl chloride and vinyl acetate. | 140–150° F | Above 150° F. |
| Polyvinyl chloride | Varies with plasticizer. | |
| Polyvinylidene chloride (Saran). | 100–325° F | Above 325° F. |
| Vinylidene chloridevinyl chloride (90-10) copolymer (Saran). | 230–280° F | Above 280° F. |
| Polyvinyl butyal | 140–158° F | Above 158° F. |
| Polytrifluorochloroethylene (Kel-F). | 346° to 570°F. depending on molecular weight. | Depends on molecular weight. |
| Polymethyl methacrylate | 140–230° F | Above 230° F. |
| Synthetic rubbers such as hard rubber. | 150–190° F | Above 190° F. |

In addition to the above materials, other thermoplastic materials such as lignin-sulfonate resins, terpene resins, and the like can be used herein. The term "thermoplastic" is accordingly used herein to refer both to thermoplastic resins and to such resins in a liquid stage of polymerization, further polymerizable to a solid polymer.

As indicated hereinbefore, the process is applicable to filter elements made of any filter material and end caps made of any thermoplastic material. However, where the end cap and the filter material are of the same material, the seal formed between the end cap and the edges of the filter is exceptionally strong.

Since no two materials have precisely the same chemical resistance to all media to be filtered, it has been found to be desirable to employ heat-sealed filter materials, internal core supports and end caps which are substantially of the same thermoplastic material under corrosive conditions or where contamination of the filter material, internal support core and/or end cap by the medium being filtered is a problem. Thus, for example, where a corrosive fluid is being filtered, the internal support or core, filter material and end cap can be made entirely from thermoplastic resins, such as polyethylene or polypropylene, or any of the other thermoplastic materials set forth hereinbefore, and the filter material heat-sealed. A filter element made entirely of one material is resistant to attack to a wide range of reagents, hence is more widely useful than a filter element wherein a second component has been introduced thereby limiting its range of application.

The filter element obtained in accordance with the invention thus comprises, in combination, a filter sheet material formed in a closed configuration having at least one open end, and an end cap closing off the open end, and formed of thermoplastic resin, the open end of the filter sheet being embedded in the end cap to a depth of from about 10% to about 90% of the cap thickness, the thermoplastic cap material permeating the sheet material from face to face thereof thereby forming a continuous leak-proof matrix of filter and thermoplastic resin at the interface between the end cap and the filter sheet material, ensuring a leak-proof seal therebetween.

The process and apparatus of the invention are well illustrated in the accompanying drawings.

FIGURES 1 to 4 show the apparatus in the sequence of steps in which it is operated to end cap a filter element.

FIGURE 1 is a schematic view of the apparatus in the first operating position, showing the water-cooled end cap holder partly in cross section, on which an end cap is positioned, the burner to heat the end cap, and the filter element holder.

FIGURE 2 is a schematic view of a portion of the apparatus of FIGURE 1 in the second operating position, wherein the end cap holder has been raised so that the end cap positioned therein is in close proximity to the burner.

FIGURE 3 is a schematic view of the apparatus of FIGURE 1, in the third operating position, after the end cap has been heated to liquefy its outer face and a portion of its thickness and the filter element to be end capped is manually held in the filter element holder, and the end cap holder again lowered.

FIGURE 4 is a schematic view of a portion of the apparatus of FIGURE 3 in the last operating position, wherein the end cap holder has been raised again to embed the filter element in the molten end cap.

FIGURE 5 is a view of a finished filter element partly in cross section, having both ends capped in accordance with the invention.

Figure 1:
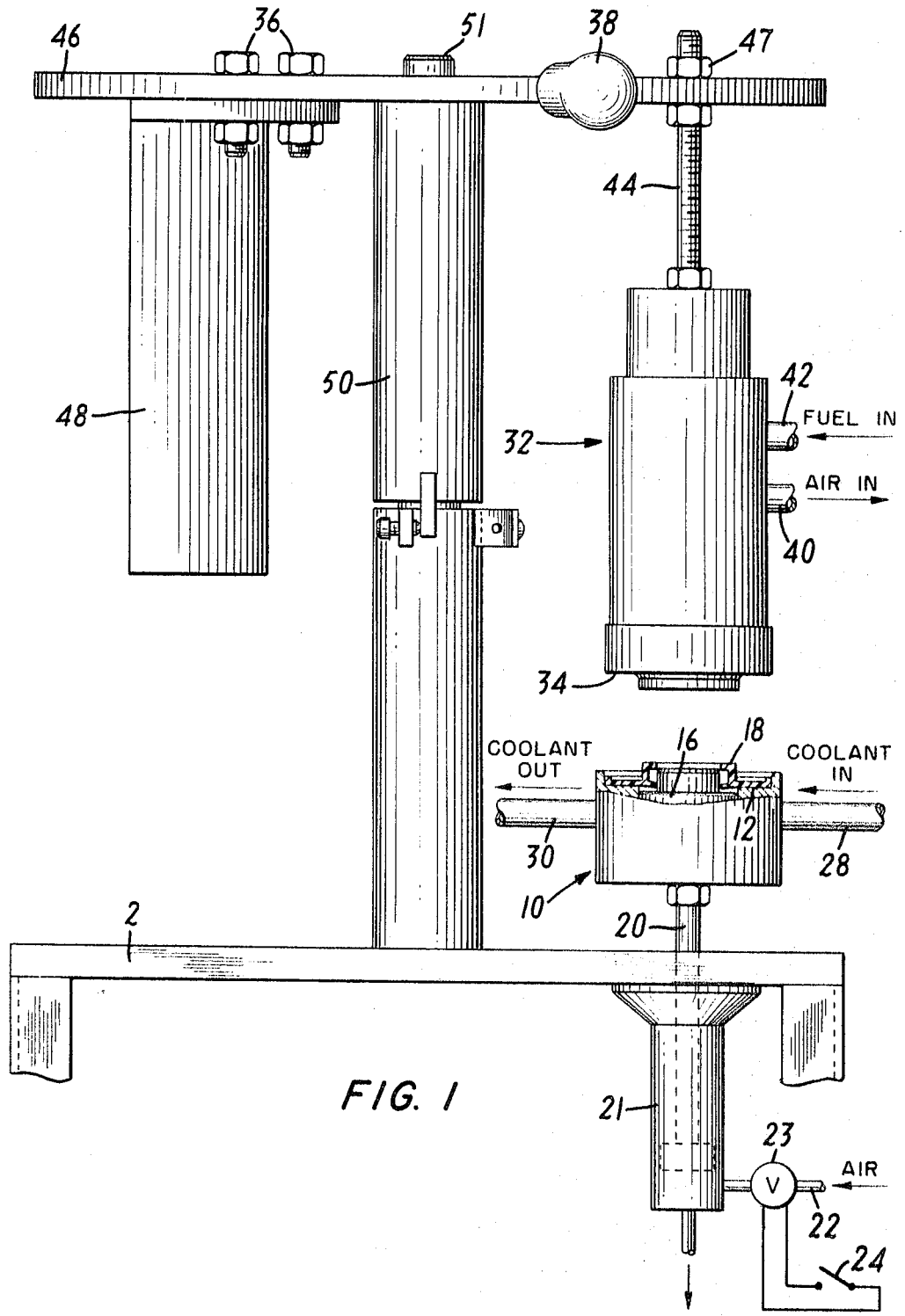

The apparatus shown in FIGURE 1 comprises a platform 2 mounted on the floor to which is attached shaft 50 which supports plate 46. Plate 46 is rotatably mounted to shaft 50 by means of swivel joint 51. Plate 46 contains handle 38 for use in manually rotating plate 46 about shaft 50.

Burner 32, having a head 34 shaped to the contour of the interior of the end cap 18 and in communication with an air source and fuel source via hoses 40 and 42, respectively, is fixedly attached via shaft 44 to plate 46 by means of collar 47. Filter element holder 48 in the form of a pliable curved metallic bracket is also attached to plate 46 by means of bolts 36.

End cap holder 10 contains a recess 12, shaped to conform to the end cap 18 positioned therein. The end cap holder 10 is attached to reciprocable shaft 20 which is positioned within a hole in platform 2. Air cylinder 21 is attached to reciprocable shaft 20, and also is in communication with an air supply via line 22 which contains electrically operated valve 23. In order to raise the end cap holder 10 to the up position, shown in FIGURE 2, and hold it there, a foot switch 24 electrically connected to valve 23 is thrown, thereby causing valve 23 to open and allowing air to enter cylinder 21. The air pushes a piston within cylinder 21 up to the length of the cylinder, and the piston in turn pushes shaft 20 and end cap holder 10 into the up position shown in FIGURE 2.

Hoses 28 and 30 for carrying a coolant fluid, such as cold water, are in communication with the cooling chamber 16 of holder 10. Chamber 16 is directly below the bottom of recess 12, so that the bottom and sides can be cooled. The walls of the end cap holder which form the recess 12 are made of a metallic material having good heat conductivity, such as aluminum, to ensure that the sides of the recess are cooled by the coolant and surrounding air, so that the sides of the end cap remain in a solid state.

In operation, an end cap is placed in the recess 12 of the end cap holder 10 as shown and the plate 46 is rotated about shaft 50 until burner 32 is positioned directly above the end cap holder 10. Switch 24 is then thrown to raise the end cap holder to the up position shown in FIGURE 2.

In FIGURE 2, burner 32 has been rotated about shaft 50 by means of handle 38 attached to plate 46 until it is directly over end cap holder 10. End cap holder 10 has been raised to a position in close proximity to burner head 34 by throwing foot switch 24 as described above.

A direct flame is applied to the end cap to heat the end cap to a temperature above its maximum softening point to liquefy at least a portion of the thickness thereof. The coolant is continually circulated through the end cap holder 10 via hoses 28 and 30, thereby chilling the recess 12 upon which the end cap is positioned, and consequently chilling at least a portion of the thickness of the end cap to a temperature well below its softening point. Next, the switch 24 is opened, thereby lowering the end cap holder and plate 46 is rotated about shaft 50 until filter element holder 48 is directly above end cap holder 10. Filter element 49 is inserted into filter element holder 48 and is manually held in place therein. Filter element 49 contains a filter material and an internal core support, the edges of the filter material and core support being of substantially the same length.

In FIGURE 3, the end cap holder has been lowered and plate 46 has been rotated about shaft 50 until filter element holder 48 is directly above end cap holder 10. Filter element 49 has been inserted within filter element holder 48 and is manually held in place therein. The end cap holder is then raised by throwing switch 24 so that the edge 52 of the filter element is embedded in the liquefied portion of the end cap and thereby is supported by the end cap holder 10 and plate 46. The liquid thermoplastic material is allowed to permeate the pores of the filter material to ensure the subsequent formation of a leak-proof seal.

In FIGURE 4, the end cap holder has been raised and the edge 52 of the filter element is embedded in the liquefiied portion of end cap 14 so that the thermoplastic material can permeate the pores of the filter material.

After the liquefied portion of the thermoplastic end cap has hardened, switch 24 is opened, thereby lowering the end cap holder and filter element embedded in the hardened end cap. The capped filter element 49 is removed from the end cap holder 10 and the procedure is repeated for the other end of the filter element.

In FIGURE 5, a tubular filter element 49 is shown, the open ends of which have been capped by thermoplastic end caps 18 and 54, such as polypropylene caps. The part of the filter element in cross section shows that part of the thermoplastic end cap has penetrated the pores of the filter material and has solidified therein, thereby forming a leak-proof seal of exceptional strength. Furthermore, the end cap and core are made of the same thermoplastic resin and have been melt bonded at the point of junction and, in essence, are one piece.

Having regard to the foregoing disclosure, the following is claimed as the inventive and patentable embodiments thereof:

1. A process for applying preformed end caps to filter sheet material formed in a substantially tubular shape, comprising heating an inside face of a thermoplastic end cap to a temperature sufficient to fuse from about 10 to about 90% of the thickness of the end cap to be adhered to the filter sheet into a liquid of a viscosity capable of penetrating through the pores of the filter sheet while cooling the outside face of the thermoplastic end cap to a temperature below its softening point to maintain the remainder of the end cap in a solid state, embedding all of the edges of one end of the filter sheet material into the liquefied end cap so that the liquefiied thermoplastic material penetrates through the pores of the embedded portion of the filter sheet material from one surface to the other, and hardening the liquid plastic thereby forming a substantially continuous leakproof matrix of end cap material permeating through the pores of the filter material and bonding the filter sheet to the end cap in a leakproof seal.

2. A process in accordance with claim 1 including the step of grinding the edges of the filter sheet so that they are substantially the same length prior to applying the end cap thereto.

3. A process in accordance with claim 1 wherein the filter sheet material includes an internal support core whose edges are substantially of the same length as the edges of the filter material.

4. A process in accordance with claim 1 wherein the filter sheet material is a thermoplastic resin.

5. A process in accordance with claim 1 wherein the filter sheet material is folded in corrugated configuration.

6. A process in accordance with claim 1 wherein the filter sheet material has an average pore size of less than about 5 microns.

7. A process in accordance with claim 1 wherein the filter sheet material includes an internal support core and the filter material, internal support core and end cap are made of the same thermoplastic material.

8. A process in accordance with claim 6 wherein the thermoplastic material is polypropylene.

9. A process in accordance with claim 1 wherein the tubular filter sheet is supported by an internal support core and the support core is also bonded to the end cap.

References Cited

UNITED STATES PATENTS

| | | | |
|---|---|---|---|
| 3,013,667 | 12/1961 | Jackson et al. | 210—487 X |
| 3,081,495 | 3/1963 | Kovatch | 264—162 X |
| 3,082,587 | 3/1963 | Brimberg | 264—249 X |
| 3,308,225 | 3/1967 | Wells | 264—249 |
| 2,732,031 | 1/1956 | Rabbitt et al. | |
| 2,962,121 | 11/1960 | Wilber. | |

ROBERT F. WHITE, Primary Examiner

K. J. HAVET, Assistant Examiner

U.S. Cl. X.R.

264—249, 257, 327